US008243075B2

(12) United States Patent
Desruisseaux (10) Patent No.: US 8,243,075 B2
(45) Date of Patent: Aug. 14, 2012

(54) GRAPHICS PROCESSING UNIT ACCELERATED DYNAMIC RADIAL TESSELLATION

(75) Inventor: Eric Desruisseaux, Montreal (CA)

(73) Assignee: Autodesk, Inc., San Rafael, CA (US)

( * ) Notice: Subject to any disclaimer, the term of this patent is extended or adjusted under 35 U.S.C. 154(b) by 764 days.

(21) Appl. No.: 12/251,167

(22) Filed: Oct. 14, 2008

(65) Prior Publication Data

US 2010/0091023 A1     Apr. 15, 2010

(51) Int. Cl.
*G06T 11/20* (2006.01)
(52) U.S. Cl. .................................................. 345/441
(58) Field of Classification Search .................. 345/441
See application file for complete search history.

(56) References Cited

U.S. PATENT DOCUMENTS

| | | | | | |
|---|---|---|---|---|---|
| 4,719,726 | A | * | 1/1988 | Bergman | 52/81.4 |
| 4,820,928 | A | * | 4/1989 | Ooyama et al. | 250/492.2 |
| 5,080,368 | A | * | 1/1992 | Weisser | 273/241 |
| 5,999,188 | A | * | 12/1999 | Kumar et al. | 345/423 |
| 7,970,279 | B2 | * | 6/2011 | Dress | 398/66 |
| 2004/0227755 | A1 | * | 11/2004 | Sfarti | 345/423 |
| 2005/0105787 | A1 | * | 5/2005 | Gulati | 382/129 |
| 2005/0231508 | A1 | * | 10/2005 | Christensen et al. | 345/428 |
| 2006/0094951 | A1 | * | 5/2006 | Dean et al. | 600/407 |
| 2007/0014488 | A1 | * | 1/2007 | Chen et al. | 382/294 |
| 2007/0068196 | A1 | * | 3/2007 | Seliktar | 63/37 |
| 2007/0075318 | A1 | * | 4/2007 | Noda et al. | 257/79 |
| 2007/0182762 | A1 | * | 8/2007 | Wu et al. | 345/647 |
| 2007/0211215 | A1 | * | 9/2007 | Meadows | 353/1 |
| 2007/0216905 | A1 | * | 9/2007 | Han et al. | 356/446 |
| 2008/0213546 | A1 | * | 9/2008 | Murata et al. | 428/195.1 |
| 2008/0273034 | A1 | * | 11/2008 | Fenney et al. | 345/423 |
| 2009/0206845 | A1 | * | 8/2009 | Mackey | 324/660 |
| 2010/0001997 | A1 | * | 1/2010 | Kajikawa et al. | 345/419 |
| 2010/0010351 | A1 | * | 1/2010 | Jovanovic et al. | 600/447 |
| 2010/0148285 | A1 | * | 6/2010 | Bauer et al. | 257/416 |
| 2010/0231555 | A1 | * | 9/2010 | Mackey | 345/174 |

OTHER PUBLICATIONS

Fourfold rotational symmetry in two-dimensional functions Rajan, P.; Reddy, H.; Swamy, M.; Acoustics, Speech and Signal Processing, IEEE Transactions on vol. 30 , Issue: 3 Digital Object Identifier: 10.1109/TASSP.1982.1163913 Publication Year: 1982 , pp. 488-499.*

A novel feature points selection algorithm for 3D triangular mesh models Zhou, Z.D.; Ai, Q.S.; Liu, Q.; Yang, L.; Xie, S.Q.; Chen, Y.H.; Signal Processing, 2008. ICSP 2008. 9th International Conference on Digital Object Identifier: 10.1109/ICOSP.2008.4697302 Publication Year: 2008 , pp. 1023-1026.*

(Continued)

*Primary Examiner* — Javid A Amini
(74) *Attorney, Agent, or Firm* — Gates & Cooper LLP (57) ABSTRACT

A method, apparatus, and article of manufacture enable the creation and display of a radial tessellation. A single source image is selected and a radial tessellation creation feature is activated. A triangular sector of the source image is specified and transferred to a texture buffer of a graphics processing unit (GPU). A radial tessellation is created using the GPU by drawing the triangular sector on a destination image, repeatedly flipping and drawing the triangular sector along a leading edge of the triangular sector to create a closed polygon, and further flipping and drawing the triangular sector onto the destination image to create outer rings around the closed polygon and filling the destination image.

18 Claims, 10 Drawing Sheets

OTHER PUBLICATIONS

Controlled field generation for quad-remeshing Oliver Schall, Rhaleb Zayer, Hans-Peter Seidel Jun. 2008 SPM '08: Proceedings of the 2008 ACM symposium on Solid and physical modeling Publisher: ACM.*

David Annal, M.D. http://www.tessellations.org/tess-symmetryl.htm, Mar. 3, 2007.*

Kendrick, Lakeside High School, Evans, GA, United States, Alok, Thomas Jefferson High School for Science and Technology, Alexandria, VA, United States; Eleanor, Palos Verdes Peninsula High School, Rolling Hills Estates, CA, United States; 1998.*

* cited by examiner

GRAPHICS PROCESSING UNIT ACCELERATED DYNAMIC RADIAL TESSELLATION

BACKGROUND OF THE INVENTION

1. Field of the Invention

The present invention relates generally to graphics processing, and in particular, to a method, apparatus, and article of manufacture for radially tessellating a region with shapes of any order, while maintaining a fluid user experience.

2. Description of the Related Art

In a post-production creative pipeline, users often need to create new textures. Textures can be mapped onto objects or simply used as backgrounds. In such a context, there are great chances the user wants the texture to be animated (e.g., over time) or patterned. A common way of creating patterned textures is the repetition of a certain region of a source image, with or without applying a symmetry transformation to it, creating tiled textures (if repeated in a grid space) or kaleidoscope-like textures (if repeated in a radial space).

In the context of automated pattern repetition, a tessellated grid can easily be made by flipping a rectangle shaped region. Triangles and regular hexagons can also be tiled to tessellate a region. However, with higher orders of shapes (e.g., regular decagons), a grid-like tessellation is impossible. Accordingly, what is desirable is the capability to automatically create a pattern with high order shapes. In addition, it is desirable to animate a pattern over time. To better understand the problems of the prior art, a description of patterns and textures is useful.

In the prior art, a user may desire to utilize a mosaic texture. To create such a texture, the user manually selects a region and then manually places triangles or other shapes into a scene to represent the mosaic. Thus, all actions required manual actions by the user. Further, in the prior art larger patterns became difficult for the user to work with and manipulate while smaller patterns required extensive manual placement. As a result, the prior art techniques are not flexible and don't allow automatic tessellation of an entire frame.

Mosaic or texture applications of the prior art are also not fully integrated into the software applications for which they are used. Accordingly, the mosaic/texture applications have limited access to tools in terms of animation. Further, prior art mosaic/texture applications are not flexible with respect to parameters the user can utilize. In addition, radial patterns are not available in the prior art. Instead, a grid-like representation of a texture is used and repeated.

SUMMARY OF THE INVENTION

One or more embodiments of the invention provide a graphics processing unit (GPU) accelerated dynamic radial tessellation. A region is radially tessellated with shapes of any order, while maintaining a fluid user experience. Each single parameter of the tessellation is animatible, creating a powerful tool that can be used to quickly generate textures.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware Environment

Figure 1:
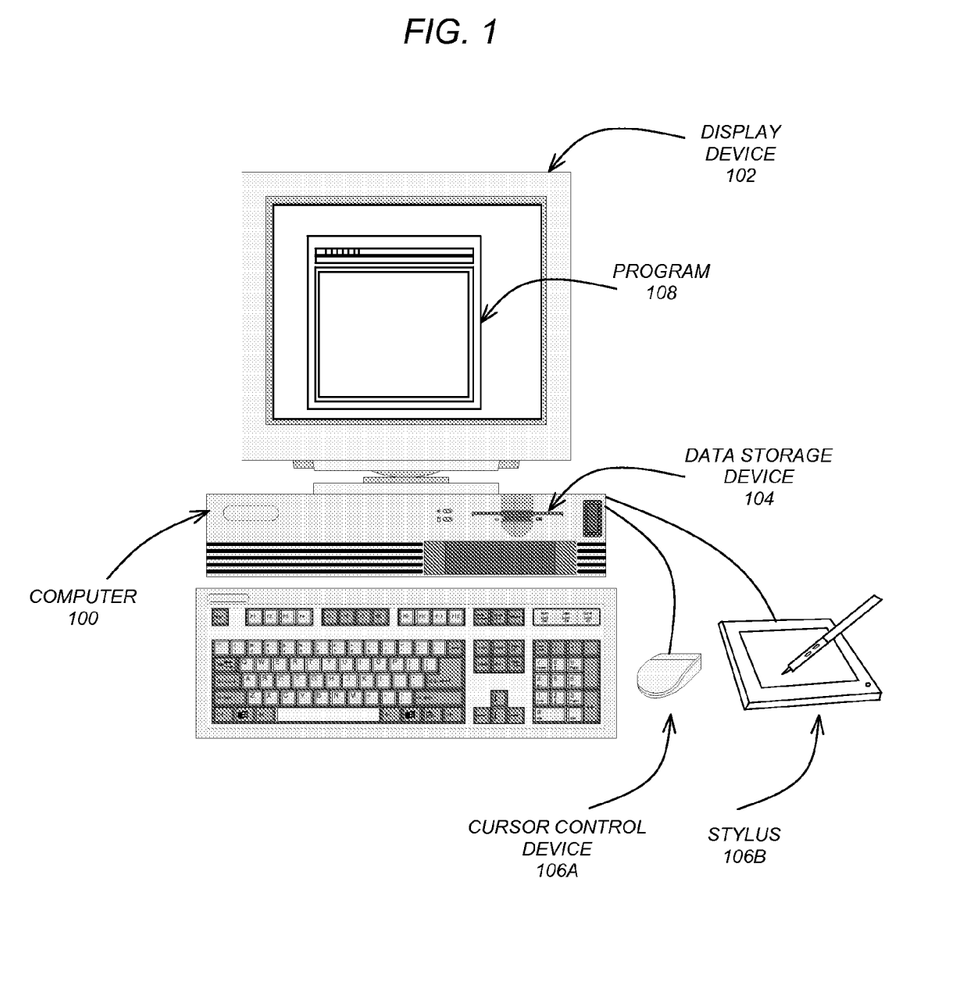
FIG. 1 is an exemplary hardware and software environment used to implement one or more embodiments of the invention.

FIG. 1 is an exemplary hardware and software environment used to implement one or more embodiments of the invention. Embodiments of the invention are typically implemented using a computer 100, which generally includes, inter alia, a display device 102, data storage device(s) 104, cursor control devices 106A, stylus 106B, and other devices. Those skilled in the art will recognize that any combination of the above components, or any number of different components, peripherals, and other devices, may be used with the computer 100.

One or more embodiments of the invention are implemented by a computer-implemented program 108 (or multiple programs 108). Such a program may be a compiler, a parser, a shader, a shader manager library, a Graphics Processing Unit (GPU) program, or any type of program that executes on a computer 100. The program 108 may be represented by one or more windows displayed on the display device 102. Generally, the program 108 comprises logic and/or data embodied in/or readable from a device, media, carrier, or signal, e.g., one or more fixed and/or removable data storage devices 104 connected directly or indirectly to the computer 100, one or more remote devices coupled to the computer 100 via a data communications device, etc. In addition, program 108 (or other programs described herein) may be an object-oriented program having objects and methods as understood in the art. Further, the program 108 may be written in any programming language including C, C++, Pascal, Fortran, Java™, etc. Further, as used herein, multiple different programs may be used and communicate with each other.

In one or more embodiments, instructions implementing the graphics program 108 are tangibly embodied in a computer-readable medium, e.g., data storage device 104, which could include one or more fixed or removable data storage devices, such as a zip drive, floppy disc drive, hard drive, CD-ROM drive, DVD drive, tape drive, etc. Further, the graphics program 108 is comprised of instructions which, when read and executed by the computer 100, causes the computer 100 to perform the steps necessary to implement and/or use the present invention. Graphics program 108 and/or operating instructions may also be tangibly embodied in a memory and/or data communications devices of computer 100, thereby making a computer program product or article of manufacture according to the invention. As such, the terms "article of manufacture" and "computer program product" as used herein are intended to encompass a computer program accessible from any computer readable device or media.

Figure 2:
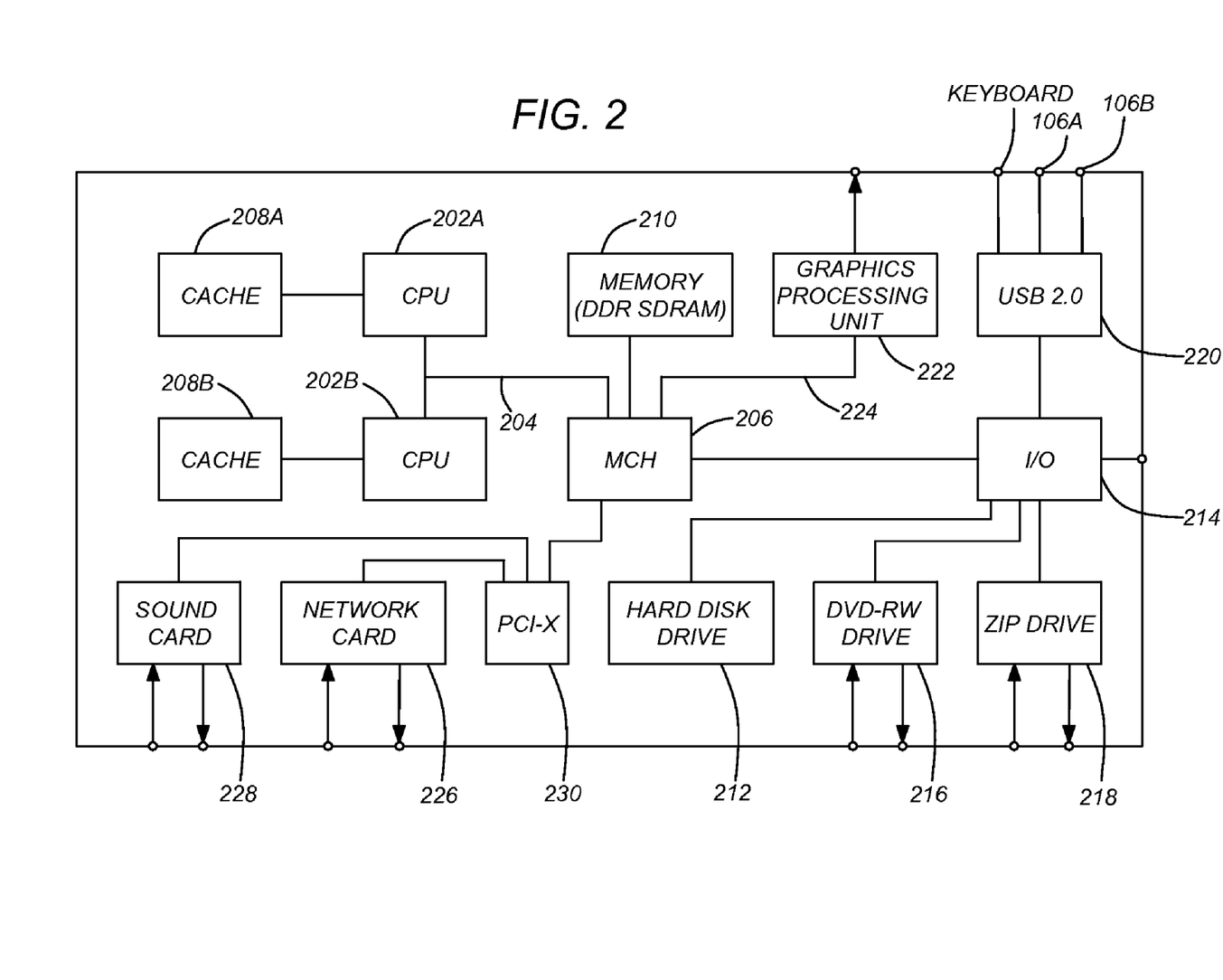
FIG. 2 illustrates further components of the computer system of FIG. 1 in accordance with one or more embodiments of the invention.

The components of computer system 100 are further detailed in FIG. 2 and, in one or more embodiments of the present invention, said components may be based upon the Intel® E7505 hub-based chipset.

The system 100 includes two central processing units (CPUs) 202A, 202B (e.g., Intel® Pentium™ Xeon™ 4 DP CPUs running at three Gigahertz, or AMD™ CPUs such as the Opteron™/Athlon X2™/Athlon™ 64), that fetch and execute instructions and manipulate data via a system bus 204 providing connectivity with a Memory Controller Hub (MCH) 206. CPUs 202A, 202B are configured with respective high-speed caches 208A, 208B (e.g., that may comprise at least five hundred and twelve kilobytes), which store frequently accessed instructions and data to reduce fetching operations from a larger memory 210 via MCH 206. The MCH 206 thus co-ordinates data flow with a larger, dual-channel double-data rate main memory 210 (e.g., that is between two and four gigabytes in data storage capacity) and stores executable programs which, along with data, are received via said bus 204 from a hard disk drive 212 providing non-volatile bulk storage of instructions and data via an Input/Output Controller Hub (ICH) 214. The I/O hub 214 similarly provides connectivity to DVD-ROM read-writer 216 and ZIP™ drive 218, both of which read and write data and instructions from and to removable data storage media. Finally, I/O hub 214 provides connectivity to USB 2.0 input/output sockets 220, to which the stylus and tablet 106B combination, keyboard, and mouse 106A are connected, all of which send user input data to system 100.

A graphics card (also referred to as a graphics processing unit [GPU]) 222 receives graphics data from CPUs 202A, 202B along with graphics instructions via MCH 206. The GPU 222 may be coupled to the MCH 206 through a direct port 224, such as the direct-attached advanced graphics port 8X (AGP™ 8X) promulgated by the Intel® Corporation, or the PCI-Express™ (PCIe) x16, the bandwidth of which may exceed the bandwidth of bus 204. The GPU 222 may also include substantial dedicated graphical processing capabilities, so that the CPUs 202A, 202B are not burdened with computationally intensive tasks for which they are not optimized.

GPU 222 (also referred to as video processing units [VPUs], graphics cards, or video cards) can be programmed in order to customize their functionality. GPU 222 programming is a very powerful and versatile technology because it allows software developers to implement complex imaging and data processing algorithms and execute the algorithms at high speeds on a computer workstation's GPU 222. Accordingly, a GPU 222 is a specialized logic chip or card that is devoted to rendering 2D or 3D images. Display adapters often contain one or more GPUs 222 for fast graphics rendering. The more sophisticated and faster the GPUs 222, combined with the architecture of the display adapter, the more realistically games and video are displayed. GPUs 222 may each have particular video/display capabilities for use in different environments. For example, GPU 222 may provide capabilities for texturing, shading, filtering, blending, rendering, interlacing/de-interlacing, scaling, multiple GPU 222 parallel execution, color correction, encoding, TV output, etc.

Network card 226 provides connectivity to another computer 100 or other device (e.g., a framestore, storage, etc.) by processing a plurality of communication protocols, for instance a communication protocol suitable to encode and send and/or receive and decode packets of data over a Gigabit-Ethernet local area network. A sound card 228 is provided which receives sound data from the CPUs 202A, 202B along with sound processing instructions, in a manner similar to GPU 222. The sound card 228 may also include substantial dedicated digital sound processing capabilities, so that the CPUs 202A, 202B are not burdened with computationally intensive tasks for which they are not optimized. Network card 226 and sound card 228 may exchange data with CPUs 202A, 202B over system bus 204 by means of a controller hub 230 (e.g., Intel®'s PCI-X controller hub) administered by MCH 206.

Those skilled in the art will recognize that the exemplary environment illustrated in FIGS. 1 and 2 are not intended to limit the present invention. Indeed, those skilled in the art will recognize that other alternative environments may be used without departing from the scope of the present invention.

Software Embodiments

One or more embodiments of the invention provide for a GPU 222 accelerated dynamic radial tessellation application 108 that allows a user to quickly generate textures. Such textures may be utilized or added to images or a clip of images in an image processing application. To better understand the context of the invention, a description of image processing and clips is useful.

As used herein, a clip is a sequence of images or frames loaded from an external device such as a VTR (video tape recorder), stored in digital format, and displayed in a clip library and on a desktop. Clips may be edited, processed, and recorded to/on external devices. Postproduction of sequences for film and video is an extremely complex undertaking. Each clip may have dozens of separate elements/operations that need to be combined/composited, each individual element requiring significant effort on the part of a digital artist. For example, to composite a moving car onto a new background may require a mask for the car be cut and perfected for every frame of the sequence.

Professional compositing software helps digital artists and managers visualize the process of clip development by building a "dependency graph" of elements and effects for each sequence. In such software, operators, tasks, or modules/functions perform a variety of functions with respect to a clip or source. For example, a module may perform compositing, painting, color correction, degraining, blurring, etc. A dependency graph of such software may also be referred to as a process tree or a schematic view of a process tree. Such a tree illustrates the elements and effects needed to complete a sequence of functions and identifies the hierarchy that shows the relationship and dependencies between elements. Accordingly, as the end-user interacts with media and tools in a schematic view, the system constructs a graph representing the activity and the relationships between the media and tools invoked upon them. The purpose of the dependency graph is to manage and maintain the relationships between the nodes representing the media and the tools.

To provide the radial tessellation, the user first selects a single source image (e.g., from within a clip of images). The user may then select a radial symmetry node and connects the radial symmetry node to the source image thereby establishing an interface into the source image. The user then selects/specifies which part of the source image to use as the initial pattern. In other words, the user selects the sector/region of interest (of the source image) to use as the originating tile (i.e., the basis for a kaleidoscopic texture).

Figure 3:
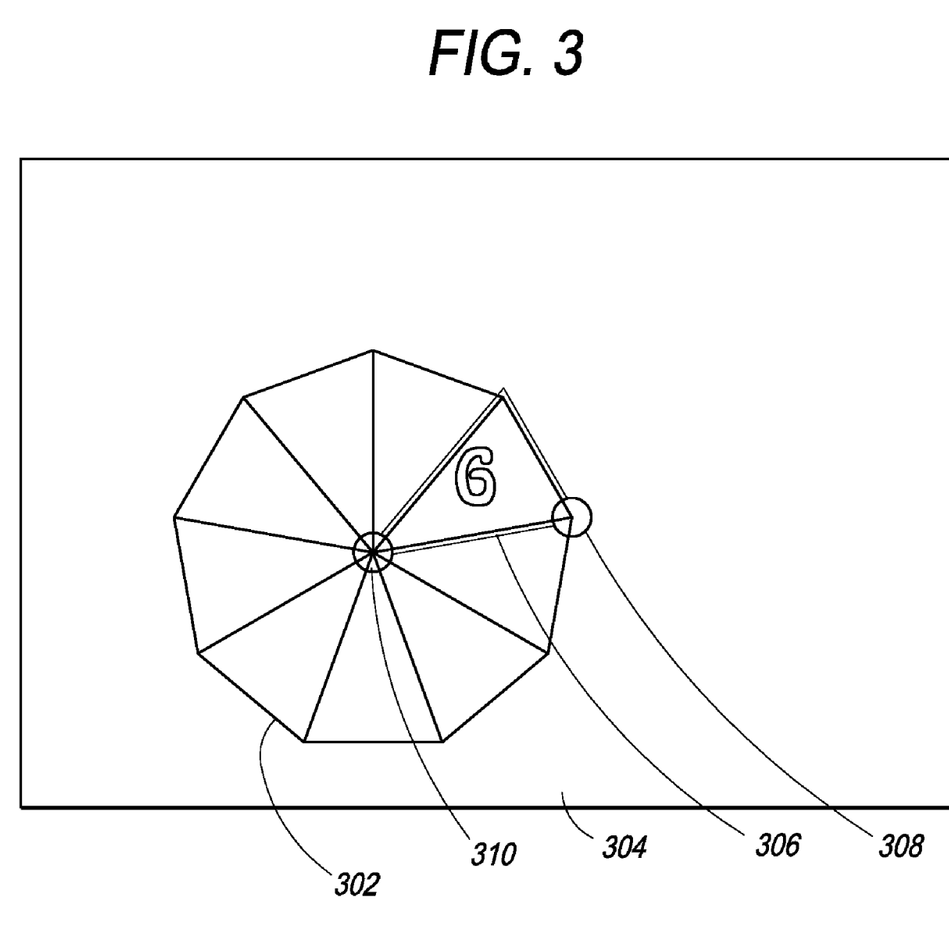
FIG. 3 illustrates the display of a 9-order circle on a source image in accordance with one or more embodiments of the invention.

Such a selection process may consist of displaying an "n-order" circle on the source image and the user selecting a triangle as part of that n-order circle. FIG. 3 illustrates the display of a 9-order circle 302 on a source image 304 where the triangle 306 has been selected by the user as the sector/tile to use as the initial pattern (in accordance with one or more embodiments of the invention). Once selected, the source texture 306 is sent/transferred to the GPU into a texture buffer. Thereafter, all texture operations are performed on the GPU, making the operations quick, and allowing the interaction to be fluid/dynamic.

Figure 4:
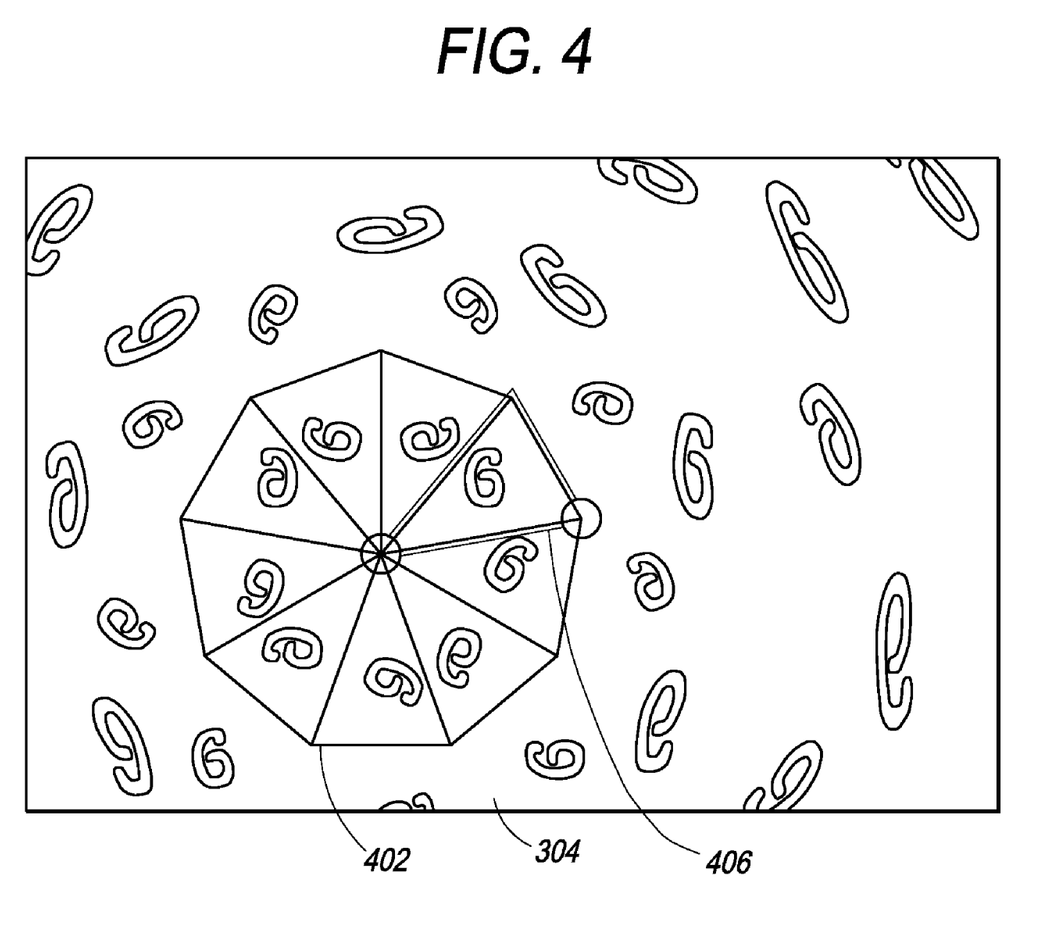
FIG. 4 illustrates a resulting radial tessellation repetition from FIG. 3 in accordance with one or more embodiments of the invention.

A frame of a desired size is identified and used to establish the destination for the texture. To create the texture, radial texture repetition is performed using the specified triangle 306 in two primary steps. In step (1), the original triangle 306 is drawn and repeated/flipped to create a circle-like shape. In step (2), for each outer ring, triangles 306 are flipped in both ways, allowing the texture to be as continuous as possible. This operation is repeated enough times to fill the entire/whole frame 306. FIG. 4 illustrates a resulting radial tessellation repetition in accordance with one or more embodiments of the invention. As illustrated, triangle 306 is first flipped to create a circle-like shape 402 and thereafter flipped again to fill the entire image 406 with the tessellation.

Figure 5:
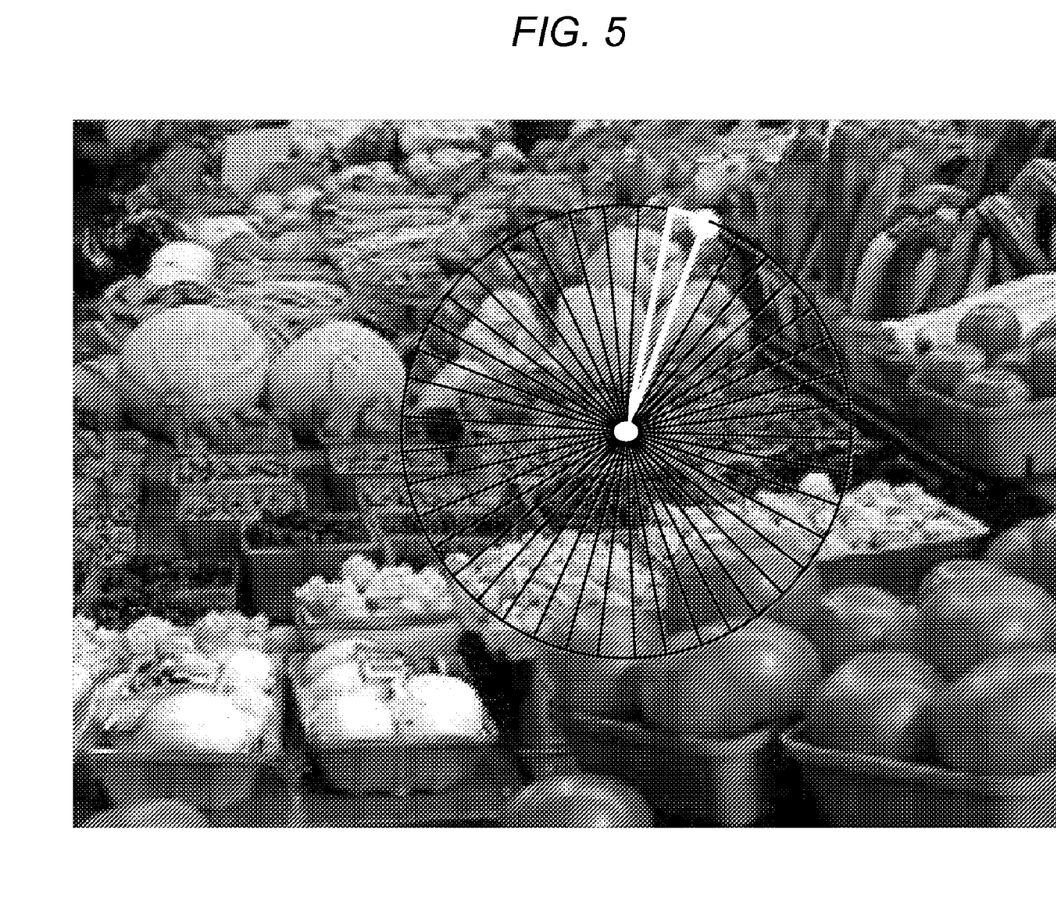
FIG. 5 illustrates an example of a selected/specified triangle in a source image to be used to create a texture in accordance with one or more embodiments of the invention.
Figure 6:
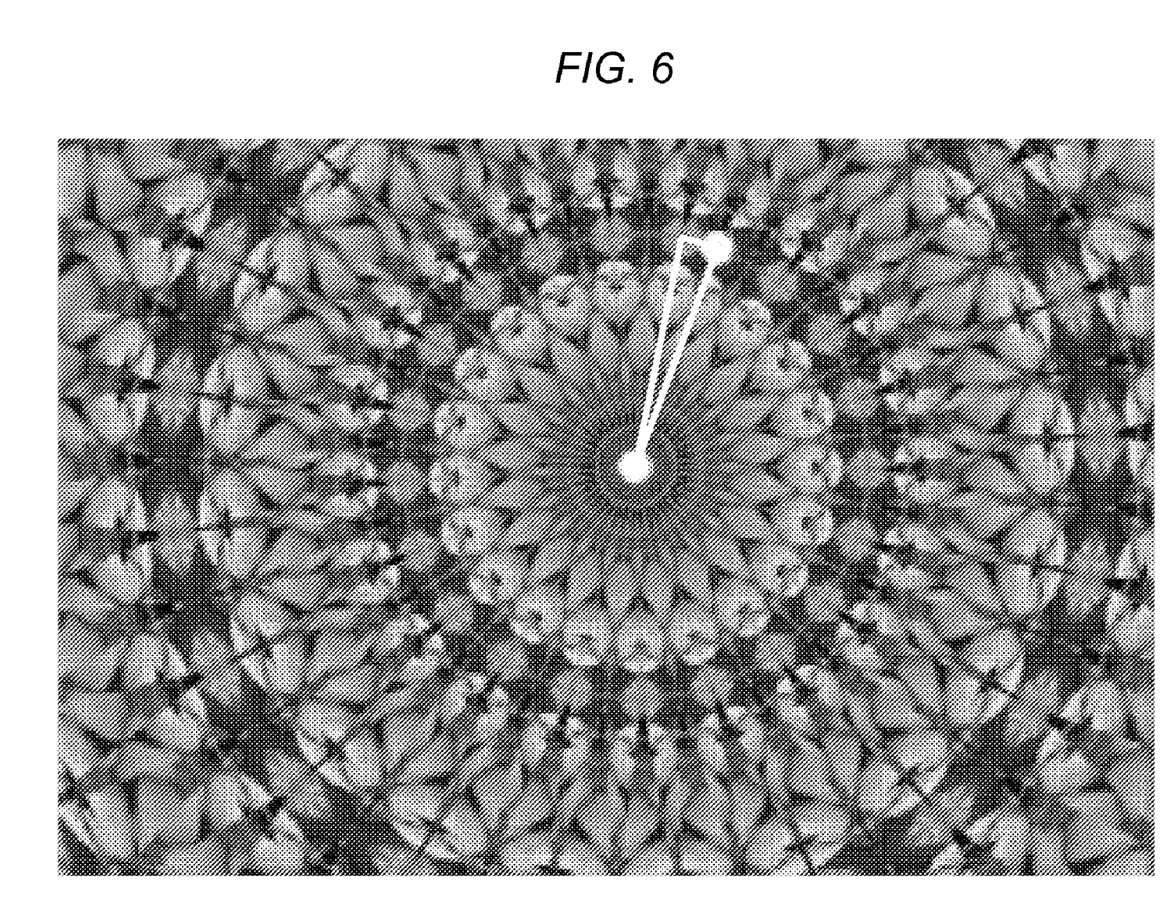
FIG. 6 illustrates a resulting radial tessellation repetition from FIG. 5 in accordance with one or more embodiments of the invention.
Figure 7:
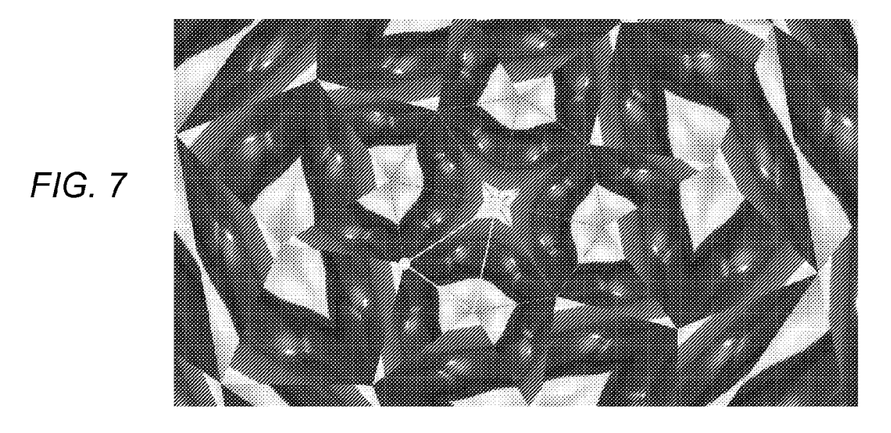
FIG. 7 illustrates an 8-order radial tessellation in accordance with one or more embodiments of the invention.
Figure 8:
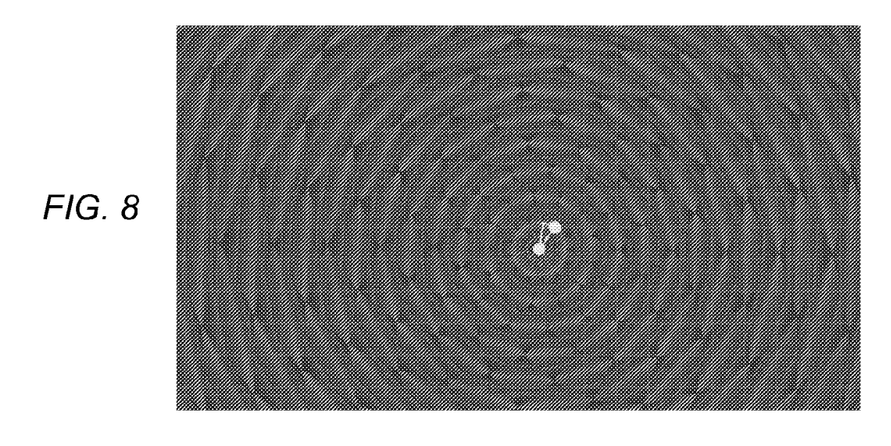
FIG. 8 illustrates a 13-order radial tessellation in accordance with one or more embodiments of the invention.
Figure 9:
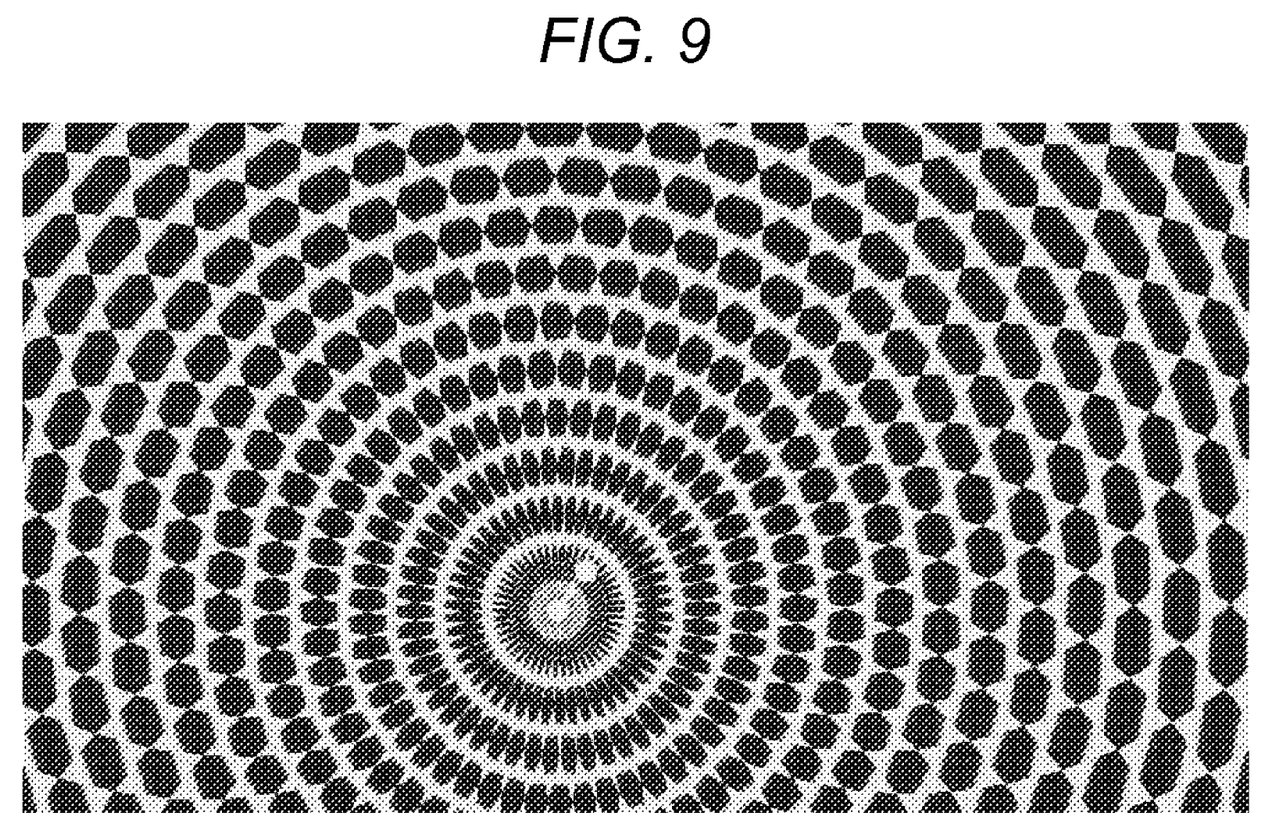
FIG. 9 illustrates a 100-order radial tessellation in accordance with one or more embodiments of the invention.

FIG. 5 illustrates an example of a selected/specified triangle in a source image to be used to create a texture. The resulting texture is illustrated in FIG. 6. FIGS. 7, 8, and 9 illustrate an order-8, order-13, and order-50 radial tessellation textures in accordance with one or more embodiments of the invention.

As can be seen throughout FIGS. 3-9, the user can also elect to use the handles 308 and 310 on the circle 302 to modify the angle and radius of the circle 302. Alternatively, a menu may be displayed and allow the user to change the desired parameters. For example, FIG. 10 illustrates a menu that allows the user to adjust the desired parameters in accordance with one or more embodiments of the invention.

Figure 10:
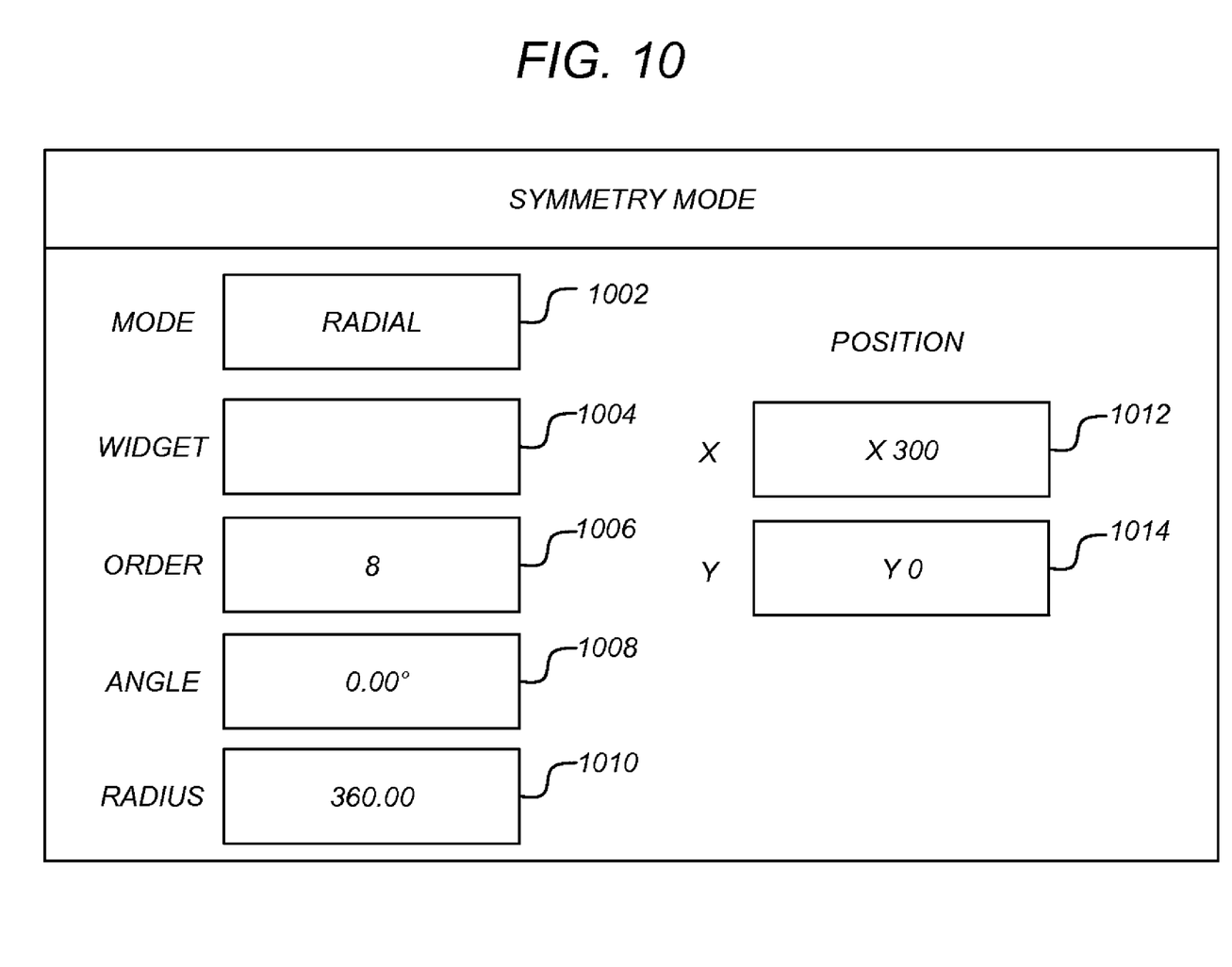
FIG. 10 illustrates a menu that allows the user to adjust the desired parameters in accordance with one or more embodiments of the invention.

In FIG. 10, the user can first specify the type of symmetry/texture effect to apply to a transformation (i.e., the type of texture to be created) in the mode text box 1002 (e.g., Radial). Once a particular mode is specified, additional parameters may be available particular for that mode. FIG. 10 illustrates possible parameters for a radial mode.

Box 1004 displays and allows the user to specify the color to be used to highlight the originating tile/triangle/handles both in the source and destination images. Different fields may be available that allow flexibility in such color selections (e.g., for the handles, for the source tile, for the destination tile, for the circle, etc.).

Field 1006 displays and allows the user to specify the order of symmetry. Such a field indicates the number of sectors or sides of the polygonal widget to be used to define the radial tessellation. An order of 2 creates a basic mirrored image. The order of symmetry can have an odd number as a value. Tiles 306 are mirrored in a counter-clockwise direction and, therefore, the sector to the right of the highlighted sector may not be its mirror image. Alternatively, the mirroring may be performed in a clock-wise direction. The order of symmetry may also have a default value of eight (i.e., a circle cut into 8 triangles). However, different orders may be specified and used as illustrated in FIGS. 3-9.

Field 1008 displays the angle of the axis of symmetry. In other words, the user can adjust (via the text box 1008 or using the handles 308 and 310) the angle used to perform the mirroring operation when creating the tessellation.

Field 1010 displays and allows the user to enter and modify the unit length (e.g., pixels, metric, etc.) of the sector radius. Thus, the user can use text box 1010 or handles 308 and 310 to specify the length of the radius in the circle (to either increase or decrease the size of the circle and the resulting sector to be used to generate the tessellation. As a default value, the radius size may be based on the frame format size. For example, the default value may be ½ the width of the image so that the entire circle 302 can fit within the image. Other default values may be defined and used if desired.

The X and Y position fields 1012 and 1014 display and allow the user to define the horizontal and vertical position of the center of symmetry (i.e., the center of the circle 402.

Thus, in combination with the parameters in FIG. 10, the user can also drag the handles 308-310 to control the various parameters. For example, the outer edge of the region of interest can be dragged to change the width or height of the selection. The inside of the region of interest or widget can be dragged to move the selection. The widget center 310 can be dragged to change the center of symmetry and the circle 308 of the outer edge of the widget can be dragged to change the radius and angle of symmetry.

In addition to the above, embodiments of the invention allow the user define and animate the tessellation over time. In this regard, a different set of parameters and/or different sector of the source image can be specified for each image/frame in a clip of images. For example, the user can utilize an order 8 tessellation on frame 1 and an order 100 tessellation on frame 1000 if desired. A playback option would then allow the user to view the result over time (e.g., showing the order increasing over time as the clip is played with the different orders of tessellation). Further, the GPU based processing would allow the dynamic viewing of the playback in an interactive an efficient manner.

Logical Flow

Figure 11:
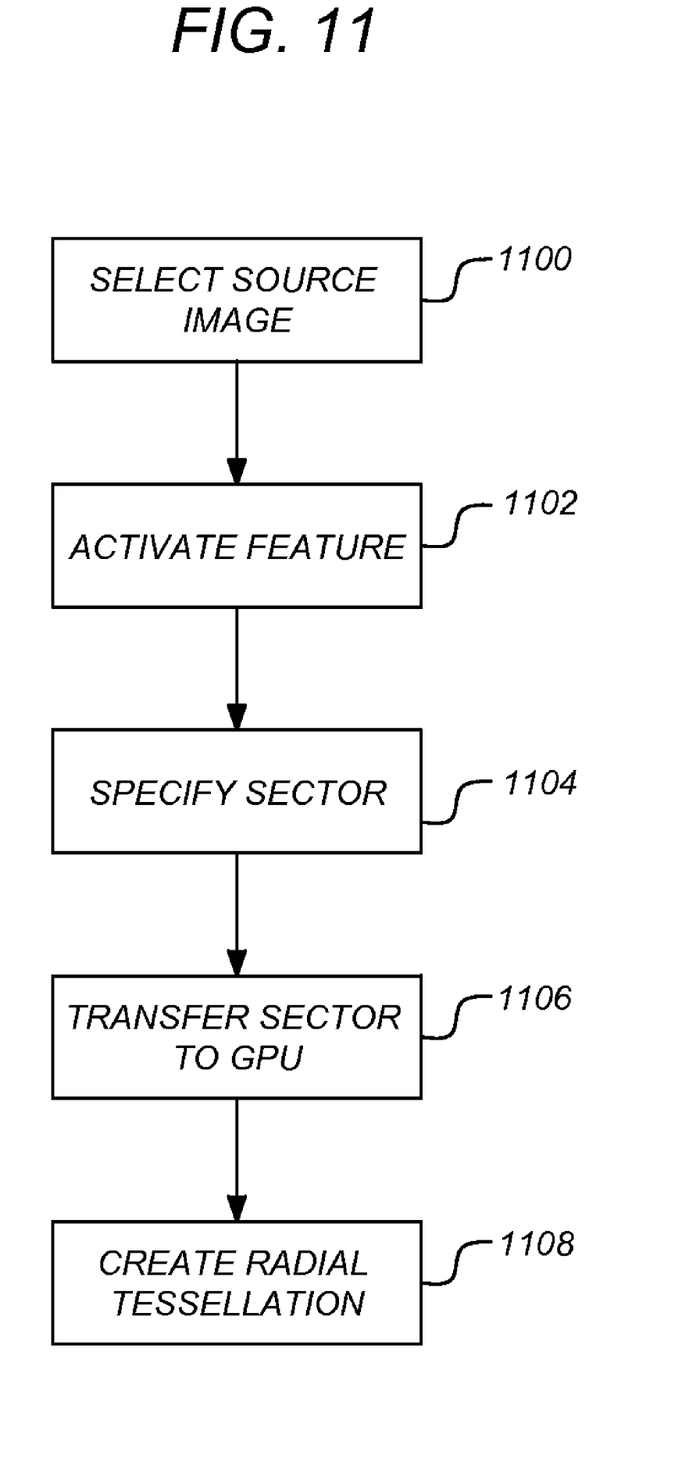
FIG. 11 illustrates the logical flow for displaying a radial tessellation in accordance with one or more embodiments of the invention.

FIG. 11 illustrates the logical flow for displaying a radial tessellation in accordance with one or more embodiments of the invention. At step 1100 a single source image is selected (e.g., a frame from a clip of image frames).

At step 1102, a feature to create a radial tessellation is activated. Such a feature can include the activation of a widget or a node that interfaces with/into the source image.

At step 1104, the user specifies a triangular sector of the source image. As described above, the triangular sector may be specified by displaying an n-order circular-like polygon on the single source image where the n-order determines how many triangles are in the circle-like polygon. The user can then select/specify a triangle in the circle-like polygon as the sector. The user may also have the ability to modify the value of the n-order. However, to ensure that the eventual radial tessellation is smooth and creates a closed polygon structure, the available values for the n-order may be predefined (e.g., 8, 13, 50). The user further has the ability to modify the angle of the sector (e.g., via text based input or graphically by dragging a handle on the triangle) or the radius of the circle-like polygon (e.g., via text based input or graphically by dragging a handle on the triangle). As used herein, the handle likely comprises a circle like structure that modifies the desired value or parameter of the triangle. The color of the handle(s) may be different (e.g., via highlighting or other known method) from remaining colors to differentiate the handles.

At step 1106, the specified triangular sector is transferred to a texture buffer of a graphics processing unit.

At step 1108, the GPU is used to create the radial tessellation. Such a radial tessellation may be performed by drawing the triangular sector on a destination image and then repeatedly flipping and drawing the triangular sector along a leading edge of the triangular sector to create a closed polygon (e.g., a circle-like polygon). The center of the closed polygon may serve as the apex or common point for all of the flipped triangles. Once the circle-like structure is drawn, the triangles are again flipped and drawn onto the destination image to create outer rings around the closed polygon and filling the destination image to create the radial tessellation. The radial tessellation is created at step 1108 dynamically in real time (i.e., without additional input from the user). Further, since the GPU is utilized, even if the n-order increases to a large polygon, the tessellation creation performance speed is maintained. Such a radial tessellation can then be used as a texture as desired in a variety of different application.

In addition, all of the steps of FIG. 11 may be performed multiple times to animate the tessellation over time across multiple frames of a clip of image data. Thus, as described above, the n-order, angle, or radius of the parameters used in the tessellation may change over time from one image frame to the next.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for displaying a radial tessellation, comprising:
   (a) selecting a single source image;
   (b) activating a feature to create a radial tessellation;
   (c) specifying a triangular sector of the source image;
   (d) transferring the triangular sector to a texture buffer of a graphics processing unit (GPU);
   (e) the GPU automatically creating, without additional user input, the radial tessellation by:
      (i) drawing the triangular sector on a destination image;
      (ii) repeatedly flipping and drawing the triangular sector along a leading edge of the triangular sector to create a closed polygon; and
      (iii) repeatedly flipping and drawing the triangular sector onto the destination image to create outer rings around the closed polygon and filling the destination image to create the radial tessellation; and
   (f) animating the radial tessellation over time across multiple frames of a clip of image data.

2. The method of claim 1, wherein the specifying the sector comprises:
   displaying an n-order circular-like polygon on the single source image, wherein the n-order determines how many triangles are in the circle-like polygon; and
   specifying a specific triangle in the circle-like polygon as the sector.

3. The method of claim 2, further comprising receiving user input modifying a value of the n-order.

4. The method of claim 1, wherein the radial tessellation is created dynamically in real time without additional input from the user.

5. The method of claim 1, further comprising receiving user input modifying an angle of the triangular sector.

6. The method of claim 1, further comprising receiving user input modifying a radius of the circle-like polygon.

7. An apparatus for displaying a radial tessellation in a computer system comprising:
   (a) a computer having a memory and a graphics processing unit (GPU);
   (b) an application executing on the computer, wherein the application is configured to:
      (i) select a single source image;
      (ii) activate a feature to create a radial tessellation;
      (iii) specify a triangular sector of the source image; and
      (iv) transfer the triangular sector to a texture buffer of the GPU; and
   (c) the GPU configured to automatically create the radial tessellation without additional user input by:
      (1) drawing the triangular sector on a destination image;
      (2) repeatedly flipping and drawing the triangular sector along a leading edge of the triangular sector to create a closed polygon;
      (3) repeatedly flipping and drawing the triangular sector onto the destination image to create outer rings around the closed polygon and filling the destination image to create the radial tessellation; and
      (4) animating the radial tessellation over time across multiple frames of a clip of image data.

8. The apparatus of claim 7, wherein the specifying the sector comprises:
   displaying an n-order circular-like polygon on the single source image, wherein the n-order determines how many triangles are in the circle-like polygon; and
   specifying a specific triangle in the circle-like polygon as the sector.

9. The apparatus of claim 8, further comprising receiving user input modifying a value of the n-order.

10. The apparatus of claim 7, wherein the radial tessellation is created dynamically in real time without additional input from the user.

11. The apparatus of claim 7, further comprising receiving user input modifying an angle of the triangular sector.

12. The apparatus of claim 7, further comprising receiving user input modifying a radius of the circle-like polygon.

13. An article of manufacture comprising a program storage device readable by a computer, tangibly embodying at least one program of instructions executable by the computer to perform method steps of displaying a radial tessellation, the method steps comprising the steps of:
   (a) selecting a single source image;
   (b) activating a feature to create a radial tessellation;
   (c) specifying a triangular sector of the source image;
   (d) transferring the triangular sector to a texture buffer of a graphics processing unit (GPU);

(e) the GPU automatically creating, without additional user input, the radial tessellation by:
  (i) drawing the triangular sector on a destination image;
  (ii) repeatedly flipping and drawing the triangular sector along a leading edge of the triangular sector to create a closed polygon; and
  (iii) repeatedly flipping and drawing the triangular sector onto the destination image to create outer rings around the closed polygon and filling the destination image to create the radial tessellation; and
(f) animating the radial tessellation over time across multiple frames of a clip of image data.

14. The article of manufacture of claim 13, wherein the specifying the sector comprises:
  displaying an n-order circular-like polygon on the single source image, wherein the n-order determines how many triangles are in the circle-like polygon; and
  specifying a specific triangle in the circle-like polygon as the sector.

15. The article of manufacture of claim 14, further comprising receiving user input modifying a value of the n-order.

16. The article of manufacture of claim 13, wherein the radial tessellation is created dynamically in real time without additional input from the user.

17. The article of manufacture of claim 13, further comprising receiving user input modifying an angle of the triangular sector.

18. The article of manufacture of claim 13, further comprising receiving user input modifying a radius of the circle-like polygon.

* * * * *